M. LEADER.
MEANS FOR PREVENTING RATTLING AND LOST MOTION OF THE STEERING ARMS OF FORD AUTOMOBILES.
APPLICATION FILED JUNE 3, 1916.
1,220,648.
Patented Mar. 27, 1917.
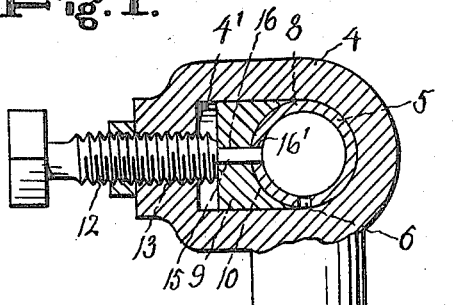
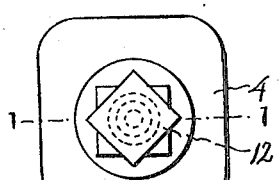
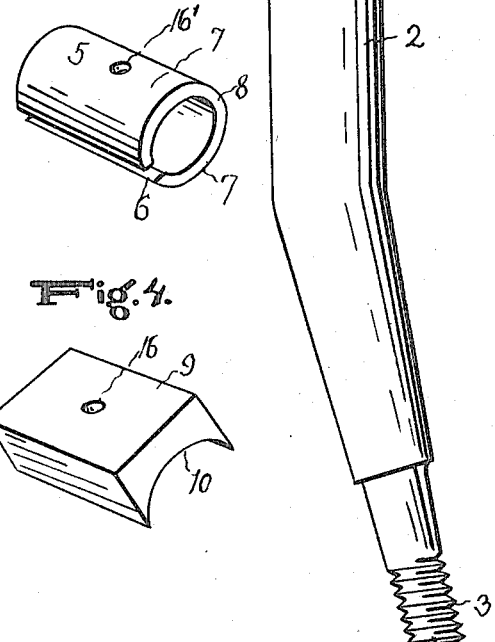
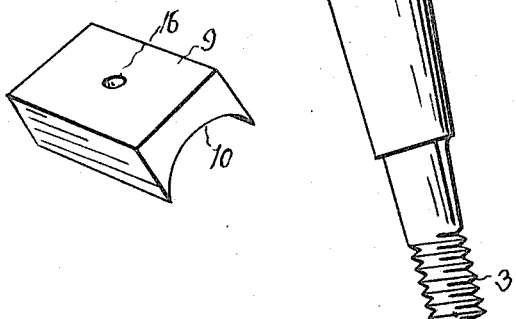
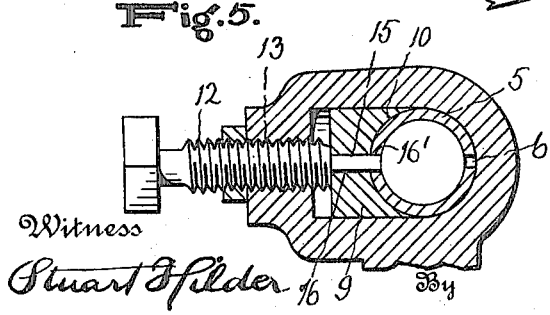
Witness
Stuart H. Pilder
Inventor,
M. Leader
E. W. Anderson & Son
his Attorneys

UNITED STATES PATENT OFFICE.

MOSES LEADER, OF VIDALIA, GEORGIA.

MEANS FOR PREVENTING RATTLING AND LOST MOTION OF THE STEERING-ARMS OF FORD AUTOMOBILES.

1,220,648.

Specification of Letters Patent.

Patented Mar. 27, 1917.

Application filed June 3, 1916. Serial No. 101,559.

*To all whom it may concern:*

Be it known that I, MOSES LEADER, a citizen of the United States, resident of Vidalia, in the county of Toombs and State of Georgia, have made a certain new and useful Invention in Means for Preventing Rattling and Lost Motion of the Steering-Arms of Ford Automobiles; and I declare the following to be a full, clear, and exact description of the same, such as will enable others skilled in the art to which it appertains to make and use the invention, reference being had to the accompanying drawings, and to letters or figures of reference marked thereon, which form a part of this specification.

Figure 1 is a side view of the steering arm, partly in section, on the line 1—1, Fig. 2.

Fig. 2 is a front view of the steering arm.

Fig. 3 is a detail perspective view of the bushing.

Fig. 4 is a similar view of the block.

Fig. 5 is a sectional view, partly broken away, of a modification.

The invention has relation to means for preventing rattling and lost motion of a pivotal shaft in its bearing, particularly in the case of the steering arm of a Ford motor car, and the invention consists in the novel construction and combinations of parts, as hereinafter set forth.

In the accompanying drawings, illustrating the invention, the numeral 2 designates the steering arm or spindle arm, having at one end a threaded portion 3, for connection with the spindle body or short jack shaft carrying a front wheel, and at its other end having a boxing 4, wherein is seated a bushing 5, within which fits the connecting rod of the steering gear.

It is found in practice that the end of this connecting rod, fitting within the bushing, works loose, causing rattling and lost motion, and it is the object of the present invention to provide a practical and efficient means, of strong, durable nature, for avoiding these objections.

The bushing 5 is split or slotted longitudinally throughout its length at 6, to divide the bushing into two halves 7, 7', connected together integrally by the material of the bushing at 8, in spring fashion, so that one half is movable toward and away from the other half, upon the spring joint as a center.

Bearing against one convex side of the bushing is a block 9, grooved semi-cylindrically at 10 to fit the bushing side, said block being located in the boxing and movable with relation to the bushing, the recess 4' of the boxing having a depth greater than the diameter of the bushing plus the thickness of said block.

A set-screw 12 has threaded engagement with a perforation 13 formed in the side wall of the boxing 4, and bears at its inner end against the outer face of said block, said set-screw having a reduced, unthreaded or smooth-walled extension 15, engaging a perforation 16 of the block 9, and at its extremity engaging a perforation or seat 16' of the bushing.

In this way, to take up wear and prevent rattling and lost motion, the set screw being adjusted inwardly, the block 9 will be pushed against the bushing, and will cause the opposite halves of the bushing to close together upon the steering arm, upon the spring joint as a center, the longitudinal slot of the bushing being at the same time narrowed. The reduced extension 15 of said screw, engaging the seat in the bushing, will prevent any turning of the bushing in the boxing, which would be prejudicial to a proper tightening of the bushing upon the steering arm, the slot of the bushing and the spring joint of the bushing being diametrically opposite and the seat 16' for said extension being spaced apart from the bushing slot and from said spring joint about ninety degrees providing for a direct movement of one half of the bushing, pushed by the block 9 engaged by the set-screw, toward the other half of the bushing, held rigidly against the wall of the boxing.

A modification of the invention is shown in Fig. 5 of the drawings, wherein the seat 16' of the bushing is located diametrically opposite the bushing slot 6, in line with the spring joint of the bushing, the free ends of the bushing at the sides of the slot in this case being pushed by the block and screw against the rigid wall of the boxing, to cause the opposite halves of the bushing to close together, and accomplish the same result.

I claim:

Means for preventing rattling and lost motion in the steering arms of automobiles, consisting of a member having at one end a boxing, said boxing having a perforation and a recess, said recess provided at one end with a semi-cylindrical wall, a hollow cylindrical bushing fitting in said recess against said semi-cylindrical wall, said bushing having a seat and being slotted throughout its length to provide two opposite halves having an integral spring joint, a block in said recess having a perforation and a semi-cylindrical grooved wall engaging said bushing; a set-screw having threaded engagement with said perforation of the boxing, bearing at its end against said block, having a reduced extension engaging the perforation of the block and at its extremity engaging said seat of the bushing.

In testimony whereof I affix my signature, in presence of two witnesses.

MOSES LEADER.

Witnesses:
R. L. KING,
L. BUNSTUS.

Copies of this patent may be obtained for five cents each, by addressing the "Commissioner of Patents, Washington, D. C."